United States Patent
Bamba

(10) Patent No.: US 11,276,367 B2
(45) Date of Patent: Mar. 15, 2022

(54) IMAGE PROCESSING DEVICE AND AN IMAGE PROCESSING PROGRAM

(71) Applicant: EIZO Corporation, Hakusan (JP)

(72) Inventor: Yusuke Bamba, Hakusan (JP)

(73) Assignee: EIZO CORPORATION, Hakusan (JP)

( * ) Notice: Subject to any disclaimer, the term of this patent is extended or adjusted under 35 U.S.C. 154(b) by 0 days.

(21) Appl. No.: 16/972,208

(22) PCT Filed: Jun. 5, 2018

(86) PCT No.: PCT/JP2018/021553
§ 371 (c)(1),
(2) Date: Dec. 4, 2020

(87) PCT Pub. No.: WO2019/234825
PCT Pub. Date: Dec. 12, 2019

(65) Prior Publication Data
US 2021/0233490 A1    Jul. 29, 2021

(51) Int. Cl.
*G09G 5/02* (2006.01)
*G09G 5/00* (2006.01)
(Continued)

(52) U.S. Cl.
CPC ..... *G09G 5/026* (2013.01); *G09G 2320/0242* (2013.01); *G09G 2340/10* (2013.01); *G09G 2380/08* (2013.01)

(58) Field of Classification Search
CPC combination set(s) only.
See application file for complete search history.

(56) References Cited

U.S. PATENT DOCUMENTS

2005/0013484 A1    1/2005  Ohkawa
2007/0273686 A1*  11/2007  Watanabe ............. G06T 15/506
                                              345/419
(Continued)

FOREIGN PATENT DOCUMENTS

JP    2005-039324 A    2/2005
JP    2011-232382 A    11/2011
(Continued)

OTHER PUBLICATIONS

International Search Report dated Sep. 4, 2018 in corresponding application No. PCT/JP2018/021553; 5 pgs.
(Continued)

*Primary Examiner* — Wesner Sajous
(74) *Attorney, Agent, or Firm* — Maier & Maier, PLLC

(57) ABSTRACT

According to an aspect of the present invention, provided is an image processing device comprising a saturation value acquisition unit configured to acquire a saturation value of a target pixel or a saturation value of a target small area including a target pixel and peripheral pixels around the target pixel, and a correction unit configured to correct the target pixel so that a corrected gradation characteristic obtained by correcting the target pixel matches a gradation characteristic synthesized by mixing a color gradation characteristic and a monochrome gradation characteristic at a predetermined mixing ratio based on the saturation value, wherein assuming that the saturation value is c, and the mixing ratio of the color gradation characteristic is W, a value of W is represented by variable c as a relationship $W=f(c)$ and satisfies a following condition. Condition: There is a saturation value c and a multiplier a which satisfy $f(c) > \alpha g(c)$, and $\alpha \geq 1$, wherein a relationship in which the mixing ratio W increases in proportion to the saturation (Continued)

value c is W=g(c) and the saturation value is equal to or greater than a threshold value.

7 Claims, 10 Drawing Sheets

(51) Int. Cl.
*G09G 5/06* (2006.01)
*H04N 1/60* (2006.01)
*H04N 9/69* (2006.01)
*H04N 1/58* (2006.01)
*H04N 9/74* (2006.01)
*H04N 9/77* (2006.01)

(56) References Cited

U.S. PATENT DOCUMENTS

| | | | |
|---|---|---|---|
| 2008/0123918 A1 | 5/2008 | Saotome et al. | |
| 2010/0008574 A1* | 1/2010 | Ishiga | H04N 5/357 382/167 |
| 2011/0109923 A1* | 5/2011 | Umeda | G06T 1/00 358/1.9 |
| 2015/0244974 A1 | 8/2015 | Arai | |
| 2015/0262552 A1 | 9/2015 | Itakura | |
| 2017/0337446 A1 | 11/2017 | Itou | |
| 2020/0226968 A1 | 7/2020 | Koudo et al. | |

FOREIGN PATENT DOCUMENTS

| | | |
|---|---|---|
| JP | 2013-089074 A | 5/2013 |
| JP | 2016-180787 A | 10/2016 |
| JP | 2018-084760 A | 5/2018 |
| WO | 2008/087886 A1 | 7/2008 |
| WO | 2014/057586 A1 | 4/2014 |
| WO | 2016067698 A1 | 5/2016 |

OTHER PUBLICATIONS

Japanese Office Action dated Feb. 17, 2021, in connection with corresponding JP Application No. 2020-523884 (6 pp., including machine-generated English translation).

The Extended European Search Report dated Apr. 26, 2021, including the Supplementary European Search Report and the European Search Opinion, in connection with corresponding EP Application No. 18921679.9 (12 pp.).

* cited by examiner

Fig. 4A

| Input Gradation Value | Brightness Value |
|---|---|
| 0 | M0 |
| 1 | M1 |
| 2 | M2 |
| ⋮ | ⋮ |
| 512 | M512 |
| ⋮ | ⋮ |
| 1023 | M1023 |

Fig. 4B

| Input Gradation Value | R Brightness Value | G Brightness Value | B Brightness Value |
|---|---|---|---|
| 0 | R0 | G0 | B0 |
| 1 | R1 | G1 | B1 |
| 2 | R2 | G2 | B2 |
| ⋮ | ⋮ | ⋮ | ⋮ |
| 512 | R512 | G512 | B512 |
| ⋮ | ⋮ | ⋮ | ⋮ |
| 1023 | R1023 | G1023 | B1023 |

IMAGE PROCESSING DEVICE AND AN IMAGE PROCESSING PROGRAM

TECHNICAL FIELD

The present invention relates to an image processing device and an image processing program.

BACKGROUND ART

In recent years, it has become possible to perform comprehensive diagnosis by displaying monochrome pixels and color pixels together on a medical diagnosis display. In the case that displaying an image on such a medical diagnostic display, when displaying monochrome pixels, the brightness value is corrected by the GSDF (Grayscale Standard Display Function) curve defined by the DICOM (Digital Imaging and Communications in Medicine) standard. On the other hand, when displaying color pixels, the brightness value is normally corrected by the γ2.2 curve defined by the sRGB standard.

FIG. 1 shows the above-mentioned the GSDF curve and the γ2.2 curve. The relationship between the gradation value input into the display and the brightness value to be displayed is called "gradation characteristic". As shown in FIG. 1, the gradation characteristic differs between monochrome pixels and color pixels. Therefore, an image processing technique has been developed that appropriately corrects the gradation characteristic for each pixel of the input image. For example, in Patent Document 1, a technique is disclosed that a color gradation characteristic and a monochrome gradation characteristic are mixed based on a mixing ratio determined according to the saturation value of each pixel of an input image or the saturation value of an area unit.

CITATION LIST

Patent Literature

Patent Literature 1: JP2016-180787

SUMMARY OF INVENTION

Technical Problem

However, in the technique of Patent Document 1, when the saturation value of each pixel is used, the color image displayed on the display seems dark to a doctor who is accustomed to the diagnosis with a display on which only the color gradation characteristic correction by the γ2.2 curve is performed for the color image. For such a diagnostician, there is a concern that an accurate diagnosis cannot be made. Further, when the saturation value for each area is used, there is a concern that the screen display may be corrupted depending on the saturation calculation result for each area and an appropriate brightness value cannot be output.

The present invention has been made in view of such circumstances, and the purpose of the present invention is to provide an image processing device and an image processing program for realizing a display with a more appropriate brightness value in a display in which monochrome pixels and color pixels are displayed together.

Solution to Problem

According to an aspect of the present invention, provided is an image processing device comprising a saturation value acquisition unit configured to acquire a saturation value of a target pixel or a saturation value of a target small area including a target pixel and peripheral pixels around the target pixel, and a correction unit configured to correct the target pixel so that a corrected gradation characteristic obtained by correcting the target pixel matches a gradation characteristic synthesized by mixing a color gradation characteristic and a monochrome gradation characteristic at a predetermined mixing ratio based on the saturation value, wherein assuming that the saturation value is c, and the mixing ratio of the color gradation characteristic is W, a value of W is represented by variable c as a relationship W=f(c) and satisfies a following condition. Condition: There is a saturation value c and a multiplier a which satisfy $f(c) > \alpha g(c)$, and $\alpha \geq 1$, wherein a relationship in which the mixing ratio W increases in proportion to the saturation value c is W=g(c) and the saturation value is equal to or greater than a threshold value.

With such a configuration, it is possible to change the relationship of the mixing ratio with the saturation ratio and the color gradation characteristic of the target pixel when the saturation of the target pixel exceeds a predetermined threshold value. As a result, when the saturation of the target pixel is low, the mixing ratio of the color gradation characteristic can be suppressed, and when the saturation of the target pixel is high, the mixing ratio of the color gradation characteristic can be increased. Therefore, when the saturation of the target pixel is high, it is possible to realize a correction for increasing the brightness value, and it is possible to display the display with a more appropriate brightness value. Moreover, since the saturation value for each area is not used, there is no concern that the screen display will be corrupted due to the difference in the saturation value for each area.

Hereinafter, various embodiments of the present invention will be illustrated. The embodiments shown below can be combined with each other. In addition, each feature constitutes the invention, respectively.

Preferably, the correction unit includes a mixing unit configured to determine the mixing ratio of a color gradation characteristic for color pixels and a monochrome gradation characteristic for monochrome pixels based on the acquired saturation value.

Preferably, the relationship f(c) includes a relationship W1=f1(c) below the threshold value and a relationship W2=f2(c) above the threshold value and with respect to any saturation value c1 below the threshold value and any saturation value c2 above the threshold value, $f1(c1) \leq f2(c2)$ is satisfied.

Preferably, the relationship f1(c) below the threshold value is a proportional function.

Preferably, there is a second threshold value assuming that the threshold value is set as a first threshold value, the second threshold value is equal to or higher than the first threshold value, and the gradient of the relationship f2(c) decreases toward zero when the saturation value is equal to or higher than the second threshold value.

Preferably, the relationship f(c) is at least a part of a sigmoid function.

Preferably, the correction unit determines the mixing ratio W and performs correction, using a relationship that the larger a difference between a brightness value in the color gradation characteristic of a target pixel and a brightness value in the monochrome gradation characteristic of the target pixel, the larger a threshold value is set.

According to another aspect of the present invention, provided is an image processing process comprising: acquiring a saturation value of a target pixel or a saturation value of a target small area including a target pixel and peripheral pixels around the target pixel, and correcting the target pixel so that a corrected gradation characteristic obtained by correcting the target pixel matches a gradation characteristic synthesized by mixing a color gradation characteristic and a monochrome gradation characteristic at a predetermined mixing ratio based on the saturation value, wherein assuming that the saturation value is c, and the mixing ratio of the color gradation characteristic is W, a value of W is represented by variable c as a relationship W=f(c) and satisfies a following condition. Condition: There is a saturation value c and a multiplier a which satisfy f(c)>αg(c), and α≥1, wherein a relationship in which the mixing ratio W increases in proportion to the saturation value c is W=g(c) and the saturation value is equal to or greater than a threshold value.

According to another aspect of the present invention, provided is an a program for causing a computer to perform an image processing process comprising: acquiring a saturation value of a target pixel or a saturation value of a target small area including a target pixel and peripheral pixels around the target pixel, and correcting the target pixel so that a corrected gradation characteristic obtained by correcting the target pixel matches a gradation characteristic synthesized by mixing a color gradation characteristic and a monochrome gradation characteristic at a predetermined mixing ratio based on the saturation value, wherein assuming that the saturation value is c, and the mixing ratio of the color gradation characteristic is W, a value of W is represented by variable c as a relationship W=f(c) and satisfies a following condition. Condition: There is a saturation value c and a multiplier a which satisfy f(c)>αg(c), and α≥1, wherein a relationship in which the mixing ratio W increases in proportion to the saturation value c is W=g(c) and the saturation value is equal to or greater than a threshold value.

BRIEF EXPLANATION OF DRAWINGS

FIG. 4A is a diagram showing a look-up table L1 for monochrome pixels.

FIG. 4B is a diagram showing a look-up table L2 for color pixels.

DESCRIPTION OF EMBODIMENTS

Hereinafter, embodiments of the present invention will be described in detail with reference to the drawings. In particular, in the present specification, a "unit" may refer to, for example, a combination of hardware resources implemented by a circuit in a broad sense and information process of software that can be concretely realized by these hardware resources.

Further, a circuit in a broad sense is realized by appropriately combining at least a circuit, a circuit, a processor, a memory, and the like. That is, an Application Special Integrated Circuit (ASIC), a programmable logic device (for example, a Simple Programmable Logic Device (SPLD), or a Complex programmable logic device (CLPD)), a Field Programmable Gate Array (FPGA), and the like may be included.

Further, in the present specification, one pixel of the input image or an area including the one pixel and peripheral pixels around the one pixel is defined as a small area. Further, the image may include both a still image and a moving image, and in the case of a moving image, one frame thereof may be pointed unless otherwise specified.

Further, in the embodiment detailed below, various information and a concept including the information are dealt with. These are represented by the high and low of the signal value as a bit set of binary numbers composed of 0 or 1, and communication or operation about such information can be executed on a circuit in a broad sense. Specifically, such information or concept may include "small area", "input gradation value", "saturation value", "brightness value", and the like. These will be described in detail again as necessary.

First Embodiment 1.1. Configuration of an Image Processing Device 100

The configuration of the image processing device 100 will be described with reference to FIG. 2. Note that the description using FIG. 2 is limited to explaining the basic functions of each component, and a detailed description of a process will be described later.

Figure 1:
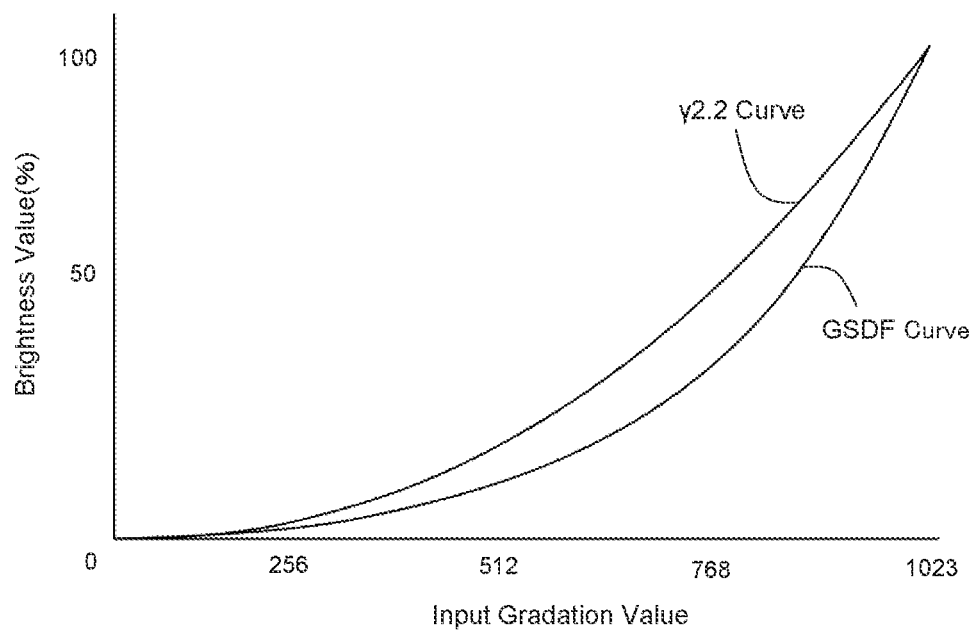
FIG. 1 is a graph showing a GSDF curve and a γ2.2 curve.
Figure 2:
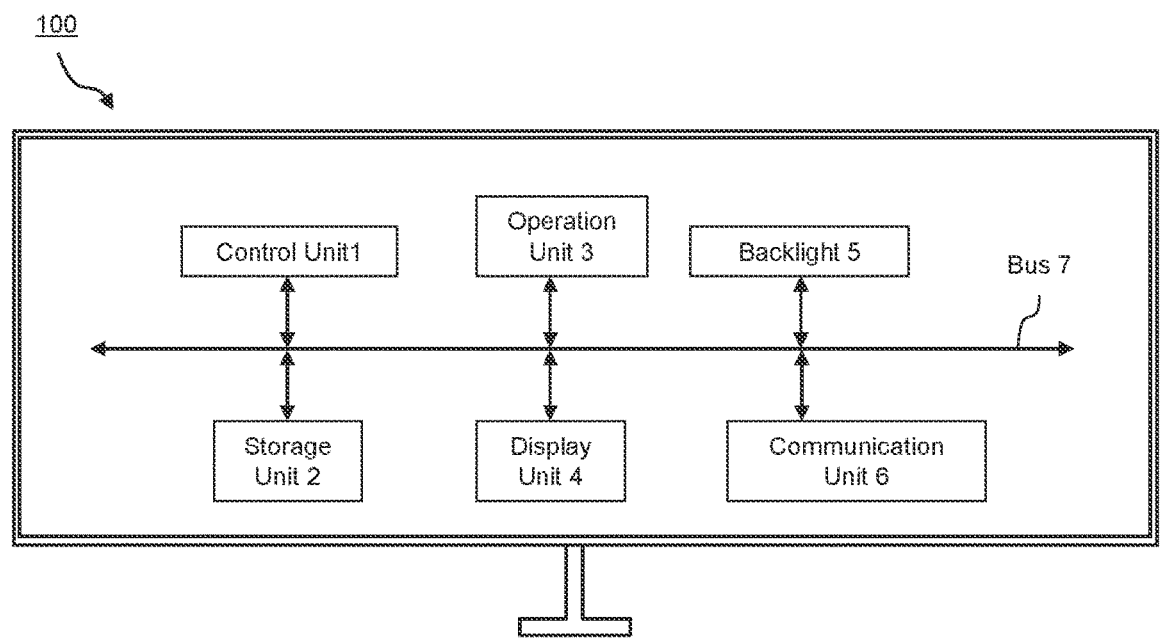
FIG. 2 is a hardware configuration diagram of an image processing device 100 according to the first embodiment.

As shown in FIG. 2, the image processing device 100 includes a control unit 1, a storage unit 2, an operation unit 3, a display unit 4, a backlight 5, a communication unit 6, and a bus 7. The control unit 1 reads a program (not shown) stored in the storage unit 2 and executes various calculation processes. The control unit 1 is composed of, for example, a CPU or the like.

The storage unit 2 stores a look-up table for correcting gradation characteristic applied to the display unit 4 and various data and programs. The storage unit 2 is composed of, for example, a memory, an HDD, or an SSD. Here, the program may be pre-installed at the time of shipment of the image processing device 100, may be downloaded as an application from a site on the Web, and may be transferred from another information processing device or recording medium by wired or wireless communication. The details of the lookup table will be described later.

The operation unit 3 operates the image processing device 100. The operation unit 3 is composed of, for example, a switch, a button, a mouse, a keyboard, a touch panel, a voice input unit, a movement recognition device using a camera, or the like. For example, the operation unit 3 operates various setting information on the OSD (On Screen Display).

The display unit 4 displays input image data (including a still image and a moving image) as an image. The display unit 4 is composed of, for example, a liquid crystal display, an organic EL display, a touch panel display, electronic paper, or other displays.

The backlight 5 illuminates the display unit 4 from the backside of the display unit 4. If the display unit 4 is not a liquid crystal display, the backlight 5 is not necessary.

The communication unit 6 transmits and receives various data to and from other information processing devices or each component. The communication unit 6 is composed of an arbitrary I/O device. The bus 7 is composed of a serial bus, a parallel bus, or the like. The bus 7 connects each unit electrically to enable transmission and reception of various data.

Each component may be realized by software or hardware. When realized by software, various functions can be realized by the CPU executing a program. The program may be stored in a built-in storage unit 2 or may be stored in a computer-readable non-temporary recording medium. Further, the program stored in the external storage unit may be read out and each component may be realized by so-called cloud computing. When realized by hardware, each component can be realized by various circuits such as ASIC, FPGA, or DRP.

1.2. Functional Configuration

Figure 3:
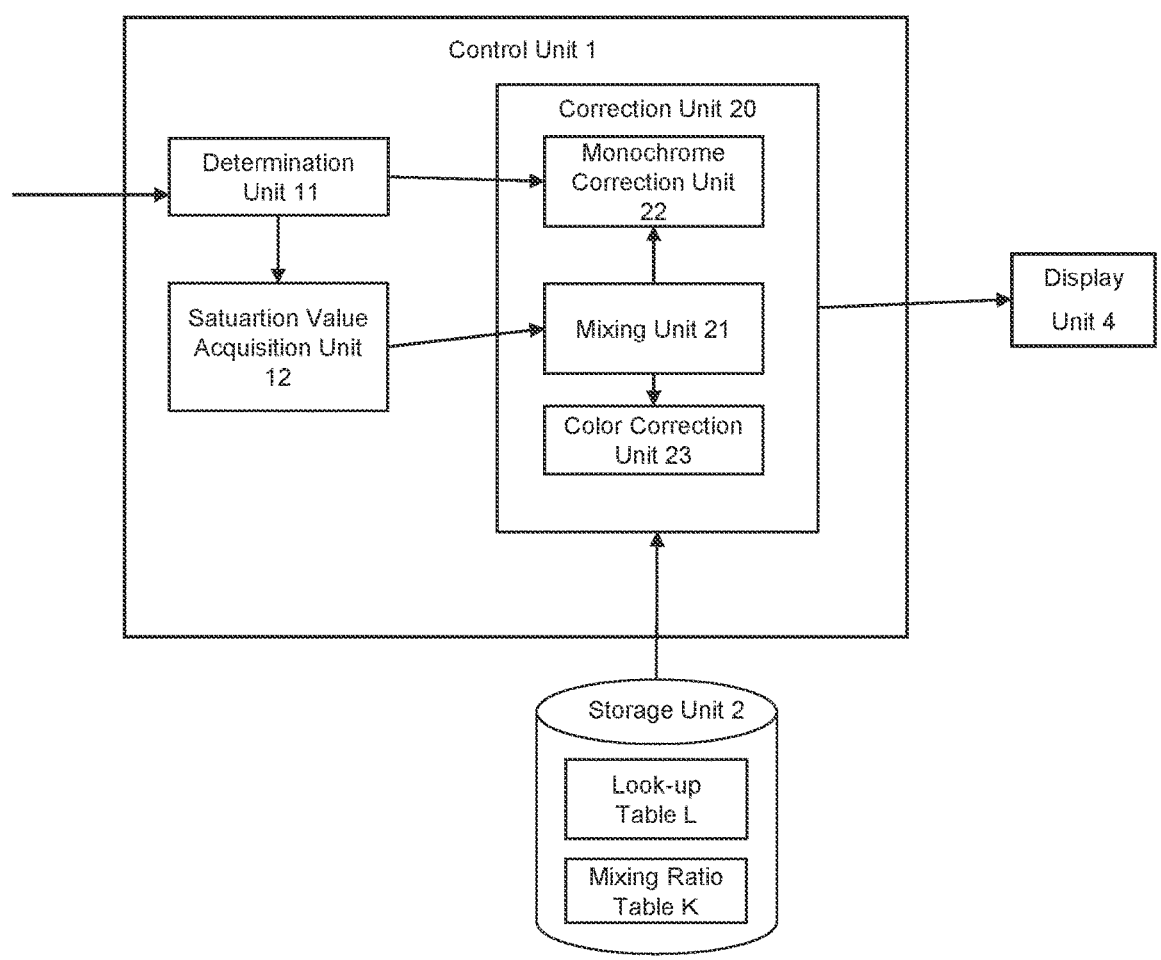
FIG. 3 is a functional block diagram of a control unit 1.

The function of the control unit 1 will be described with reference to FIG. 3. As shown in FIG. 3, the control unit 1 includes a determination unit 11, a saturation value acquisition unit 12, and a correction unit 20. The correction unit 20 includes a mixing unit 21, a monochrome correction unit 22, and a color correction unit 23.

The determination unit 11 determines whether a target pixel of input image data input into the image processing device 100 is monochrome or color. Here, various methods are known as the determination method. As an example, a method of determining monochrome may be adopted where the target pixel is determined to be monochrome, if the input gradation values (R, G, B) of the target pixel are plotted in the RGB space and the distance from the straight line defined in the (1,1,1) direction in the RGB space falls within the reference value. In the present embodiment, the input gradation value is defined as a 10-bit digital value from 0 to 1023.

The saturation value acquisition unit 12 acquires the saturation value (hereinafter, also referred to as the saturation value c) of the target pixel of the input image data input into the image processing device 100 based on the input gradation value. In the present embodiment, the saturation value is defined as an 8-bit digital value from 0 to 255. Here, the saturation value acquisition unit 12 may acquire the saturation value of the target small area including the target pixel and the peripheral pixels around the target pixel. In this case, for example, the arithmetic mean may be calculated and used as the saturation value of the target small area, or one saturation value in the target small area may be obtained as a representative value.

The correction unit 20 performs color gradation characteristic correction for color pixels and monochrome gradation characteristic correction for monochrome pixels on the input image data. Here, the gradation characteristic refers to the relationship between the input gradation value of the target pixel of the input image data and the brightness value when the target pixel is output on the display. Color gradation characteristic correction means to correct the gradation characteristic of a color pixel. Monochrome gradation characteristic correction means to correct the gradation characteristic of a monochrome pixel.

The mixing unit 21 determines a mixing ratio (hereinafter, also referred to as a mixing ratio W) of the color gradation characteristic and the monochrome gradation characteristic based on the saturation value acquired by the saturation value acquisition unit 12. The details of the specific process of the mixing unit 21 will be described later.

The monochrome correction unit 22 performs monochrome gradation characteristic correction on each target pixel of the input image data. The details of the specific process of the monochrome gradation characteristic correction performed by the monochrome correction unit 22 will be described later.

The color correction unit 23 performs color gradation characteristic correction on each target pixel of the input image data. The details of the specific process of the color gradation characteristic correction performed by the color correction unit 23 will be described later.

As an example, the storage unit 2 stores a look-up table L for performing gradation characteristic correction and a mixing ratio table K in which the relationship between the saturation value c and the mixing ratio W is defined.

The display unit 4 is configured to display the target pixel of the input image data with a brightness value corresponding to the gradation characteristic corrected by the monochrome correction unit 22 or the color correction unit 23

1.3. Look-Up Table

The lookup table L stored in the storage unit 2 will be described with reference to FIG. 4A and FIG. 4B. Note that the method of defining the look-up table L described below is merely an example and is not limited to the mode described here.

As shown in FIG. 4A and FIG. 4B, the storage unit 2 stores a look-up table L1 for monochrome pixels and a look-up table L2 for color pixels. The lookup table L1 defines input gradation values from 0 to 1023 and corresponding brightness values. The brightness values M0 to M1023 are any values from 0% to 100%. Here, 0% represents the minimum brightness which can be expressed by the display unit 4, and 100% represents the maximum brightness which can be expressed by the display unit 4. In the look-up table L1, the input gradation value and the brightness value are associated with each other in a one-to-one manner satisfying the GSDF curve defined by the DICOM standard. Note that the brightness value may be defined as a 16-bit digital value from 0 to 65535 instead of 0% to 100%.

On the other hand, the lookup table L2 defines the input gradation value and the corresponding brightness value for each RGB. In the lookup table L2, the relationship between the input gradation value and the brightness value defined in the lookup table L1 is defined for each RGB. That is, the brightness values from R0 to R1023 correspond to R (red), the brightness values from G0 to G1023 correspond to G (green), and the brightness values from B0 to B1023 correspond to B (blue). In the look-up table L2, the input gradation value and the brightness value are associated with each other in a one-to-one manner satisfying the γ2.2 curve defined by the sRGB standard.

Thereby, the gradation characteristic correction of the monochrome pixel can be performed so that the GSDF curve is satisfied by referring to the lookup table L1. Further, the gradation characteristic correction of the color pixel can be performed so that the γ2.2 curve is satisfied by referring to the lookup table L2.

1.4. Mixing Unit 21

The mixing unit 21 determines the mixing ratio W for mixing the color gradation characteristic for color pixels (corresponding to the look-up table L2) and the monochrome gradation characteristic for monochrome pixels (corresponding to the lookup table L1) based on the saturation value c acquired by the saturation value acquisition unit 12. Here, the mixing ratio W means that the color gradation characteristic is realized when W=1 and the monochrome gradation characteristic is realized when W=0. Further, when W=0.5, the gradation characteristic obtained by mixing the color gradation characteristic and the monochrome gradation characteristic by 50% each are combined.

The relationship between the saturation value c and the mixing ratio W is defined in the mixing ratio table K stored in the storage unit 2. By referring to the mixing ratio table K, the mixing unit 21 can determine the mixing ratio W corresponding to the saturation value c acquired by the saturation value acquisition unit 12.

Figure 5:
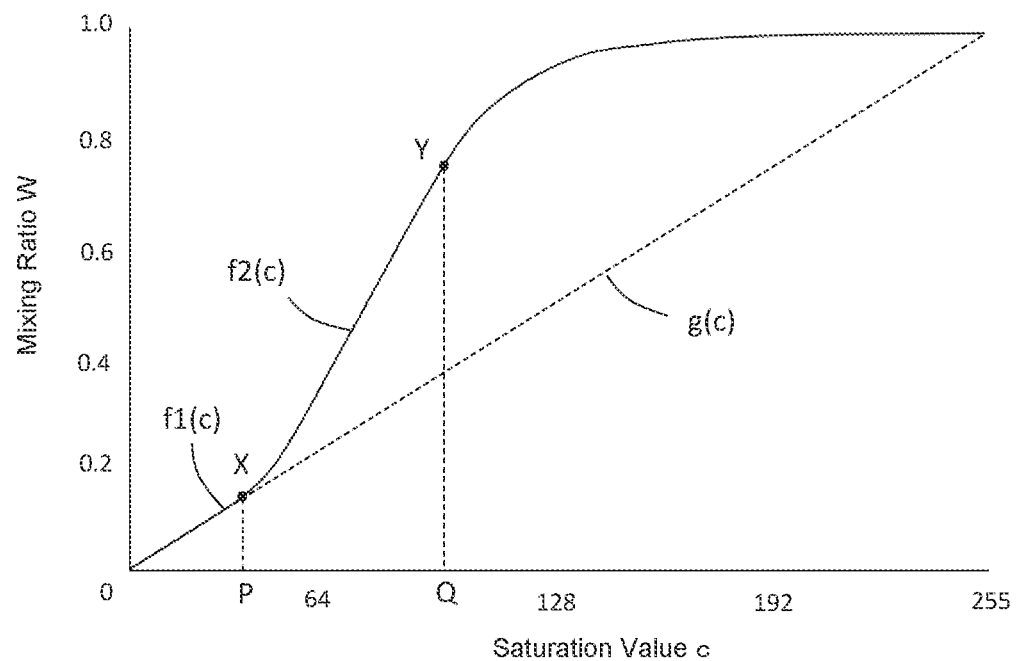
FIG. 5 is a diagram showing the relationship between saturation value c and the mixing ratio W.

FIG. 5 is a diagram showing the relationship W=f(c) (hereinafter, also referred to as the correspondence relationship f(c)) between the saturation value c and the mixing ratio W, and corresponds to the mixing ratio table K. Further, in FIG. 5, the relationship W=g(c) (Hereinafter, also referred to as proportional relationship g(c)) is shown, in which the mixing ratio W increases proportionally from the minimum value 0 to the maximum value 1 as the saturation value c increases from the minimum value 0 to the maximum value 255. Further, a first threshold value P and a second threshold value Q for the saturation value c are shown.

As shown in FIG. 5, the correspondence relationship f(c) can take a value larger than the proportional relationship g(c) in the region where the saturation value c is equal to or higher than the first threshold value P (that is, the region after the point X in f(c)). In other words, when the saturation value c is equal to or greater than the first threshold value P, there are a saturation value c and a multiplier a satisfying the condition f(c)>αg(c) and α≥1.

With this configuration, when the saturation value c is equal to or higher than the first threshold value P, the mixing ratio W of the color gradation characteristic can be increased compared to the proportional relationship g(c) in which the mixing ratio W of the color gradation characteristic increases proportionally to the saturation value c. As a result, when the saturation value c is equal to or higher than the first threshold value P, the ratio of the color gradation characteristic to the input pixel becomes high, and an image with a higher brightness value can be realized.

Here, the value of the multiplier a is any value of 1 to 20, preferably 1.5 to 15, and more preferably 2 to 10. Specifically, the value of the multiplier a is, for example, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, or 20 and may be within the range between any two values exemplified here.

Here, when the saturation value c is equal to or higher than the first threshold value P, the above condition is satisfied for 50% or more of the saturation values from the first threshold value P to the maximum value 255. Specifically, the percentage of the saturation values is 50%, 55%, 60%, 65%, 70%, 75%, 80%, 85%, 90%, or 95%, and may be within the range between any two values exemplified here. More preferably, the percentage may be 70%. As a result, it is possible to increase the mixing ratio of the color gradation characteristic more than the mixing ratio in the case where the proportional relationship g(c) is applied, for 70% or more of the saturation value c equal to or higher than the first threshold value P. Therefore, it is possible to realize an image with an increased brightness value for 70% or more of the saturation value c equal to or higher than the first threshold value P.

Further, preferably, when the saturation value c is equal to or higher than the first threshold value P, the above condition is satisfied for the saturation value included in the lower region of 50% or more from the first threshold value P to the maximum value 255. Specifically, the percentage of the lower region is 50%, 55%, 60%, 65%, 70%, 75%, 80%, 85%, 90%, or 95%, and may be within the range between any two values exemplified here. More preferably, the percentage may be 90%. As a result, it becomes possible that the mixing ratio of the color gradation characteristic is increased in the lower region of 90% of the saturation values from the first threshold value P to the maximum value 255 in the correspondence relationship f(c). Therefore, it becomes possible to realize an image with an increased brightness value in the lower region of 90% or more of the saturation value from the first threshold value P to the maximum value 255.

Further, in the example shown in FIG. 5, the relationship f(c) between the saturation value c and the mixing ratio W includes the relationship W=f1(c) below the first threshold value P and the relationship W=f2(c) above the first threshold value P. Assuming that the arbitrary saturation value below the first threshold value P is c1 and the arbitrary saturation value above the first threshold value P is c2, f1(c1)≤f2(c2) is satisfied.

Further, in the example of FIG. 5, f1(c) is a proportional function and is consistent with the proportional relationship g(c). On the other hand, in the example of FIG. 5, at least a part of the sigmoid function is used for f2(c). Note that, f1(c) and f2(c) are not limited to these, and any relationship may be used as long as f1(c1)≤f2(c2) is satisfied. In this way, by making f1(c) a proportional function, it is possible to increase the mixing ratio of the monochrome gradation characteristic in the lower of the saturation value c. As a result, in the lower region of the saturation value c, it is possible to suppress the generation of noise due to the high mixing ratio of the color gradation characteristic. At the same time, it is possible to prevent a large deviation from the intended color display due to an excessively high ratio of monochrome gradation characteristic.

Further, the gradient of f(c) increases in the region where the saturation value c is equal to or higher than the first threshold value P and equal to or lower than the second threshold value Q, and the value of the mixing ratio W greatly increases. Further, the gradient of f(c) decreases toward zero and f(c) increase gently in the region where the saturation value c is equal to or higher than the second threshold value Q and the saturation value is equal to or less than the maximum value 255 (that is, the region above the point Y at f(c)).

In this way, by defining the relationship between the saturation value c and the mixing ratio W, it is possible to perform gradation characteristic correction in which the monochrome gradation characteristic and the color gradation characteristic are mixed, with the mixing ratio of the color gradation characteristic suppressed in the lower region of the saturation value c. At the same time, it is possible to increase the mixing ratio of the color gradation characteristic in the upper region than the first threshold value P.

1.5. Monochrome Correction Unit 22

The monochrome correction unit 22 refers to the look-up table L1 and acquires a brightness value corresponding to the input gradation value of the target pixel which is determined as a monochrome pixel by the determination unit 11 As mentioned above, the look-up table L1 is defined to satisfy the GSDF curve. As a result, monochrome pixels can be displayed with a brightness value which satisfies the GSDF curve.

Further, the monochrome correction unit 22 refers to the look-up table L1 and determines the brightness value for mixing based on the mixing ratio W about the input gradation value of the target pixel determined as the color pixel by the determination unit 11.

1.6. Color Correction Unit 23

The color correction unit 23 refers to the look-up table L1 and determines the brightness value for mixing based on the mixing ratio W about the input gradation value of the target pixel determined as the color pixel by the determination unit 11.

The control unit 1 display the pixels determined as monochrome pixels by the determination unit 11 on the display unit 4 based on the brightness value determined by the monochrome correction unit 22. On the other hand, the control unit display the pixels determined as the color pixels by the determination unit 11 on the display unit 4 based on the brightness value determined by the monochrome correction unit 22 and the brightness value determined by the color correction unit 23.

Hereinafter, the brightness value when displaying color pixels will be specifically described. As an example, the brightness value after mixing (MR, MG, MB) can be obtained as the following Formula (1) to Formula (3), where the input gradation value of the target pixel (R, G, B)=(80, 90, 100) and the mixing ratio W of the color gradation characteristic is 0.7.

$$MR = L2(80) \times 0.7 + L1(80) \times 0.3 \quad (1)$$

$$MG = L2(90) \times 0.7 + L1(90) \times 0.3 \quad (2)$$

$$MB = L2(100) \times 0.7 + L1(100) \times 0.3 \quad (3)$$

Here, the brightness value of the lookup table L1 is L1(80), and the brightness value of the lookup table L2 is L2(80) when the input value is 80. The same is applied to other input values 90 and 100.

1.7. Procedure of Correction Process

Figure 6:
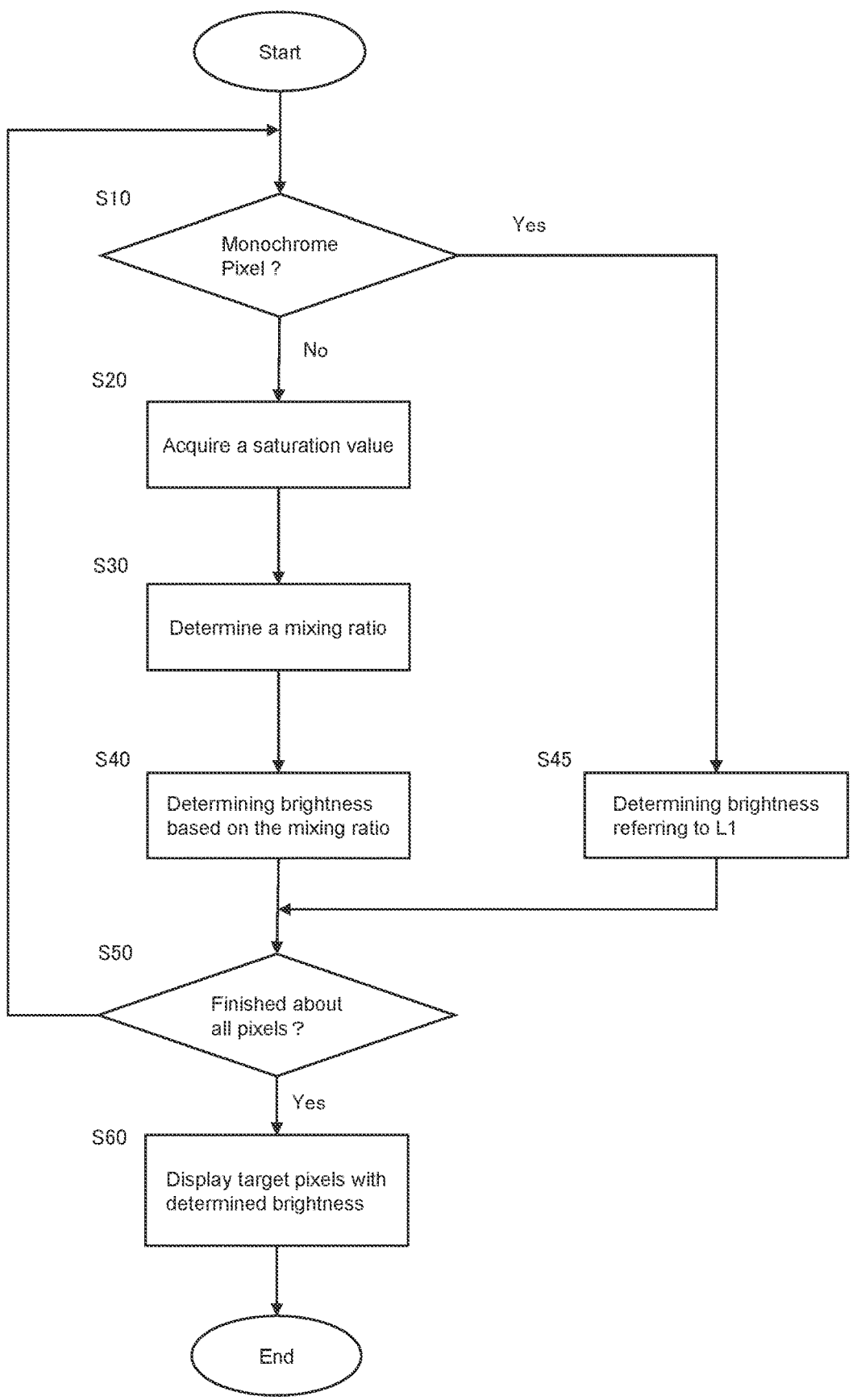
FIG. 6 is a process flow for explaining the procedure of correction process.

The procedure of the correction process in the present embodiment will be described with reference to FIG. 6. The following process is executed by, for example, the control unit 1 comprised of the CPU.

In step S10, the determination unit 11 performs a monochrome determination on the target pixel of the input image data. When the determination unit 11 determines the input pixel as monochrome, step S45 is performed. On the other hand, when the determination unit 11 determines that the input pixel as color, step S20 is performed.

In step S20, the saturation value acquisition unit 12 acquires the saturation value c for the target pixel or the target small area determined as color by the determination unit 11.

Next, in step S30, the mixing unit 21 determines the mixing ratio W of the color gradation characteristic with reference to the mixing ratio table K stored in the storage unit 2 based on the acquired saturation value c.

Next, in step S40, the monochrome correction unit 22 and the color correction unit 23 refer to the look-up tables L1 and L2 based on the input gradation value of the input pixel, and determine the brightness value after gradation correction synthesized by mixing the values of the lookup tables L1 and L2 based on the mixing ratio W determined in step S30.

On the other hand, in step S45, the monochrome correction unit 22 refers to the look-up table L1 stored in the storage unit 2 for the target pixel determined as monochrome by the determination unit 11, and determines the brightness value corresponding to the input gradation value of the target pixel.

In step S50, the correction unit 20 determines whether the processes of step S10 to step S45 have been completed for all the pixels of the input image data or not. If the process is not completed, step S10 is performed again. On the other hand, if the process is completed, step S60 is performed.

In step S60, the control unit 1 controls the display unit 4 so that the input image data is displayed with the brightness value determined in step S40 and/or step S45.

As described above, in the present embodiment, the control unit 1 includes a saturation value acquisition unit 12 and a correction unit 20. The saturation value acquisition unit 12 acquires the saturation value of the target pixel or the target small area of the input image data. The correction unit 20 corrects the target pixel based on the acquired saturation value so that the corrected gradation characteristic obtained by correcting the target pixel matches the combined gradation characteristic synthesized by mixing the color gradation characteristic for color pixels and the monochrome gradation characteristic for monochrome pixels at a predetermined mixing ratio.

Here, with respect to the correspondence W=f(c) where c is a variable, there are a saturation value c and a multiplier a satisfying $f(c) > \alpha g(c)$ and $\alpha \geq 1$ for the proportional relation g(c), where W is the mixing ratio of the color gradation characteristic.

With the configuration above, it is possible to increase the mixing ratio W of the color gradation characteristic in the region above the first threshold value P, as compared with the case where mixing ratio W is defined by the proportional relation g(c). As a result, in the region above the first threshold value P, the mixed gradation characteristic can be closer to the gradation characteristic based on the γ2.2 curve.

1.8. Modification

Figure 7A:
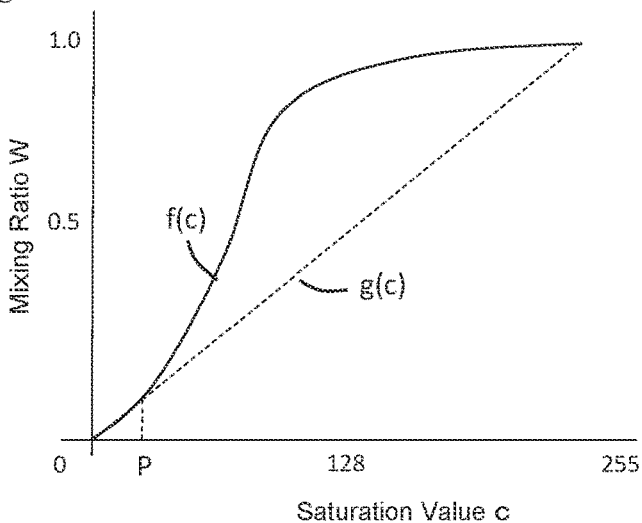
FIG. 7A is a diagram showing the relationship between the saturation value and the mixing ratio in the modified example 1.

FIG. 7A shows the correspondence f(c) between the saturation value c and the mixing ratio W as the first modification. In this example, the correspondence W=f(c) of the mixing ratio W with respect to the saturation value c is expressed by one sigmoid function. Specifically, the correspondence f(c) is expressed by the following Equation (1).

$$f(c) = \frac{1}{1+e^{-a(c-b)}} \quad \text{[Equation 1]}$$

$$f(c) = \frac{1}{1+e^{-a(c-b)}}$$

Here, the coefficients a and b are set as a=18, b=128 in the example shown in FIG. 7A, but they are not limited to this example. With this configuration, it is possible to specify the relationship between the saturation value and the mixing ratio to satisfy the above conditions by using one function, and it becomes easy to define the correspondence f(c).

Figure 7B:
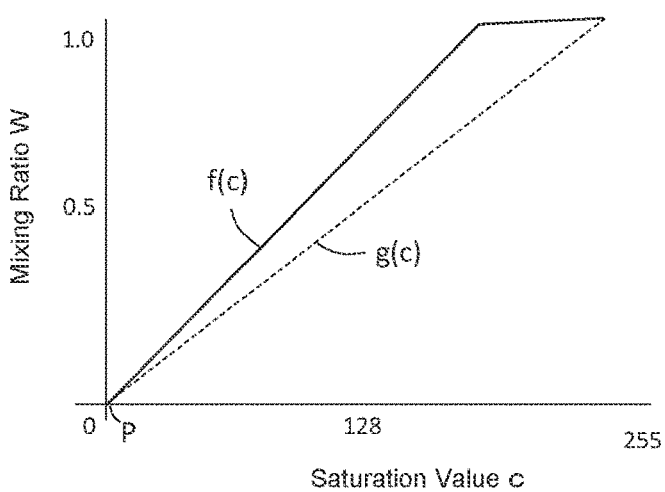
FIG. 7B is a diagram showing the relationship between the saturation value and the mixing ratio in the modified example 2.

FIG. 7B shows the correspondence f(c) between the saturation value c and the mixing ratio W as the second modification. In this example, the correspondence W=f(c) of the mixing ratio W with respect to the saturation value c is defined as f1(c) is a linear function and f2(c) is a constant. With this configuration, it is possible to obtain the mixing ratio W for the saturation value c by a simpler calculation.

Figure 7C:
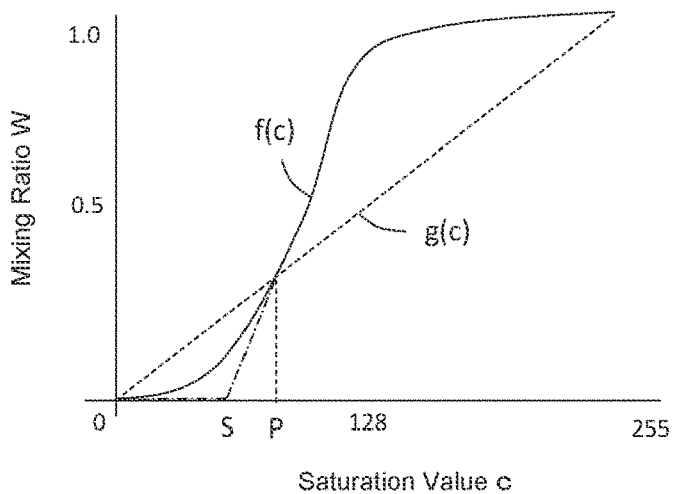
FIG. 7C is a diagram showing the relationship between the saturation value and the mixing ratio in the modified example 3.

FIG. 7C shows the correspondence f(c) between the saturation value c and the mixing ratio W as the third modification. In this example, with respect to the correspondence relationship f(c) and the proportional relationship g(c), f(c)<g(c) is satisfied until the saturation value c reaches the threshold value P. In this way, it is also possible to obtain the same effect as that of the above embodiment.

Here, in FIG. 7C, the relationship between the saturation value c and the mixing ratio W is not limited to monotonous increase where the saturation value c is equal to or less than the threshold value P. For example, the mixing ratio W may be 0, where the saturation value c is equal to or less than the threshold value P. Specifically, as shown by the chain line in FIG. 7C, when 0≤c≤S, W may be 0 and when c≥S, W may be monotonically increased toward f(P), where S is any threshold value between 0 and P.

Hereinafter, in the above embodiment, the reason for increasing the mixing ratio of the monochrome gradation characteristic when the saturation value c is low, will be described. When the difference in brightness value, on a low-saturation image in which monochrome pixels and color pixels are mixed, between the monochrome gradation characteristic for monochrome pixels and the color gradation characteristic for color pixels is large, the difference may be perceived by the user as noise. Therefore, it is necessary to perform gradation characteristic correction for color pixels of a low-saturation image with increasing the mixing ratio of monochrome gradation characteristic so that the noise is not perceived.

Similarly, on a high-saturation image in which monochrome pixels and color pixels are mixed, if the difference in brightness value between the monochrome gradation characteristic and the color gradation characteristic is large, the difference may be perceived as noise. However, the noise is rarely perceived on high-saturation images. The reason is that the brightness of colors (i.e. of each RGB color) is lower than that of monochrome, thus it is difficult for the user to perceive the difference in brightness at high saturation.

Also, another reason is that it is easy to perceive the difference due to the color difference in the low-saturation image, but it is difficult to perceive the difference due to the color difference in the high-saturation image. As described above, in the high-saturation image, even if the mixing ratio of the color gradation characteristic is increased, the appearance of noise is not perceived by the user. Then, in the high-saturation image, by increasing the mixing ratio of the color gradation characteristic, it is possible to prevent the color image on the display from being perceived as dark without deteriorating the image quality.

2. Second Embodiment

The second embodiment differs from the first embodiment in that the correspondence F(c) between the saturation value c and the mixing ratio W is defined, considering the difference between the brightness value defined by the GSDF curve and the brightness value defined by the γ2.2 curve for the input gradation value. The same components as those in the first embodiment are designated by the same reference numerals, and the description thereof will not be repeated.

Figure 8A:
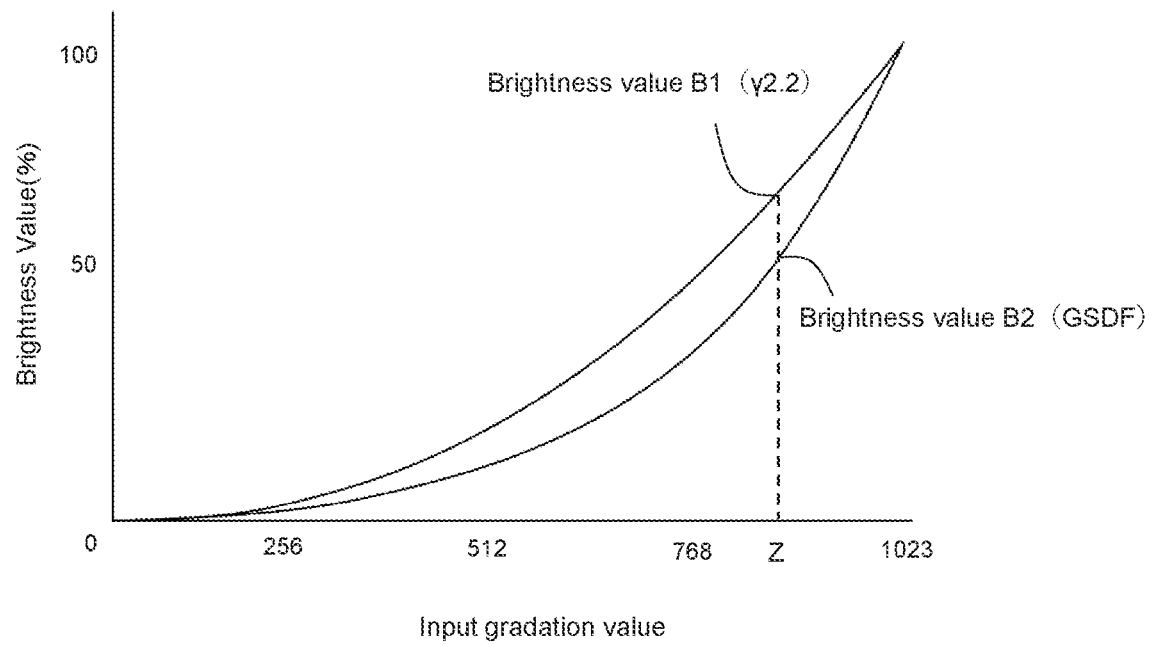
FIG. 8A is a diagram showing the difference in the brightness value between the GSDF curve and the γ2.2 curve.

FIG. 8A shows the GSDF curve and γ2.2 curve. Here, the brightness value on the γ2.2 curve is B1, and the brightness value on the GSDF curve is B2, where the input gradation value is Z. As shown in FIG. 8A, the difference between the brightness value B1 and the brightness value B2 changes depending on the input gradation value.

Figure 8B:
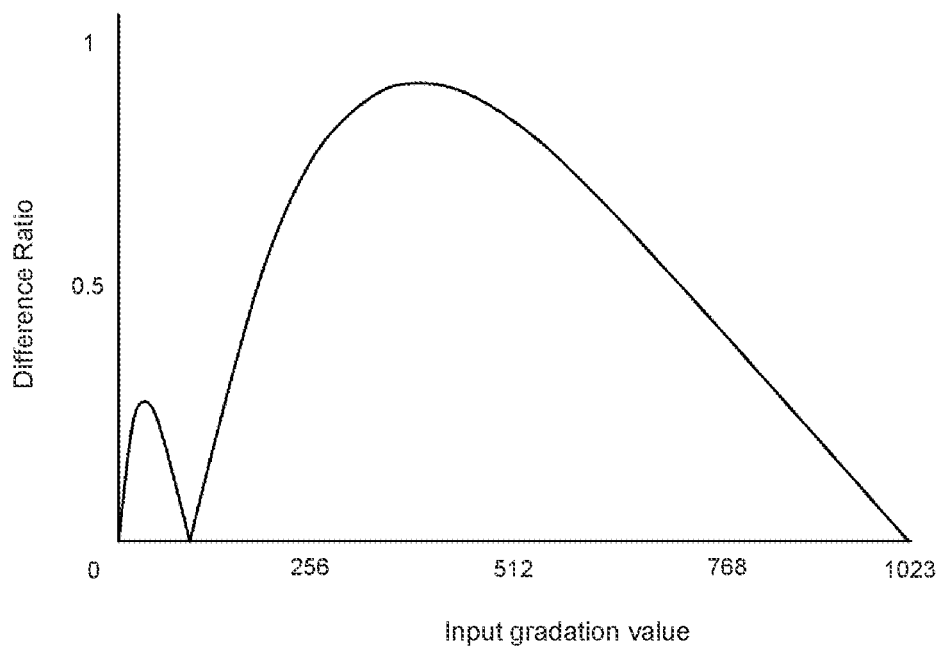
FIG. 8B is a diagram showing the difference ratio of the brightness values between the GSDF curve and the γ2.2 curve.

FIG. 8B shows the difference ratio C between the brightness value B1 and the brightness value B2 based on FIG. 8A. Here, the difference ratio C is calculated by the following equation (4), where | | represents an absolute value.

$$C=|(B1-B2)/B2| \quad (4)$$

Here, a large difference between the brightness value B1 and the brightness value B2 corresponding to the input gradation value means that the difference in the brightness value after the correction between monochrome gradation characteristic correction by GSDF curve and color gradation characteristic correction by γ2.2 curve is large. In such a case, if the mixing ratio W of the color gradation characteristic is rapidly increased, noise is generated, and the image quality is deteriorated.

Figure 9A:
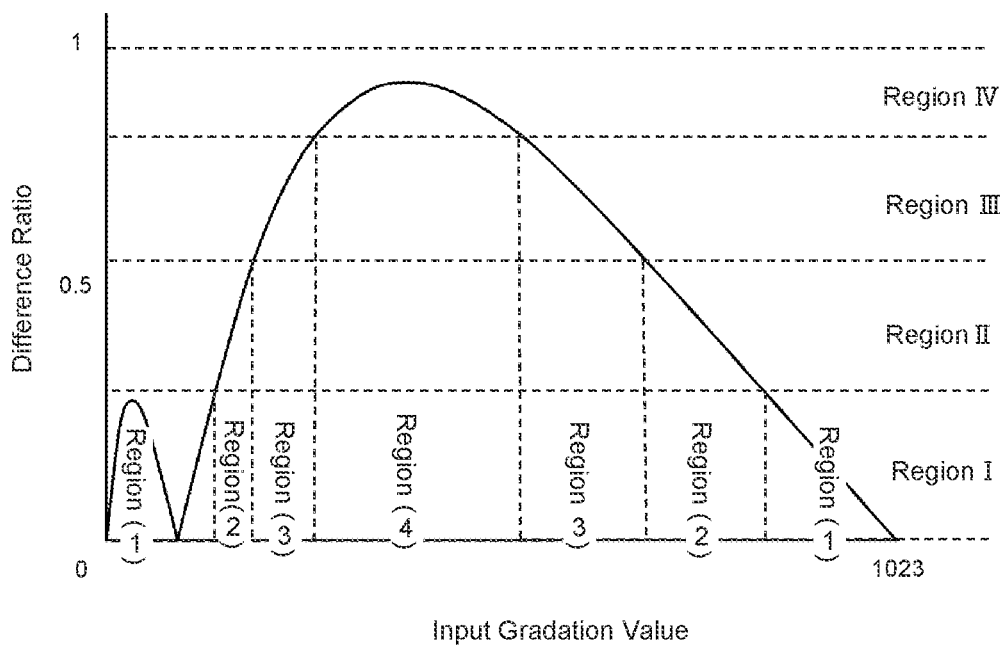
FIG. 9A is a diagram in which the input gradation value is divided into regions according to the magnitude of the difference ratio with respect to FIG. 8B.

Therefore, as shown in FIG. 9A, region I to region IV are defined according to the magnitude of the difference ratio between the brightness value B1 and the brightness value B2. Then, the input gradation values corresponding to the region I to region IV are defined as the region (1) to region (4).

Figure 9B:
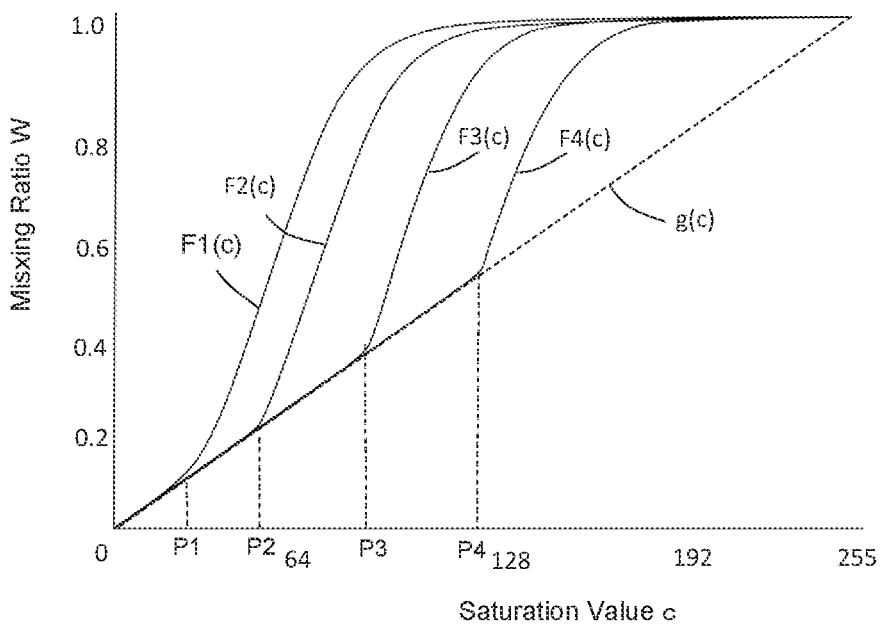
FIG. 9B is a diagram in which a plurality of relationships between the saturation value c and the mixing ratio W are defined corresponding to the region division of the input gradation value.

Further, as shown in FIG. 9B, a plurality of correspondence relationships between the saturation value c and the mixing ratio W are prepared as shown in F1(c) to F4(c). Here, in FIG. 8B and FIG. 9, the correspondence relationship F1(c) is applied to the input gradation value belonging to the region where the difference between the brightness value B1 and the brightness value B2 is the smallest (corresponding to the region (1)). Then, the correspondence F2(c) is applied to the input gradation value in the region where the difference between the brightness value B1 and the brightness value B2 is the next smallest (corresponding to the region (2)). In this way, the correspondence relationships F1(c) to F4(c) used to determine the mixing ratio is defined based on the input gradation value.

Here, as the input gradation value determining the correspondence relationship F1(c) to F4(c), arithmetic means of the three input gradation values (R, G, B) of the target pixel may be adopted, or alternatively, a specific one of the three values may be adopted as a representative value.

The relationships F1(c) to F4(c) can be specifically realized by changing the coefficient b in the above-mentioned [Equation 1]. As an example, the sigmoid function described in [Equation 1] is defined as a=18 and b=55 at F1(c), a=18 and b=70 at F2(c), a=18 and b=96 at F3(c), and a=18 and b=128 at F4(c).

Then, in the first thresholds P1 to P4 corresponding to the relations F1(c) to F4(c), P1 is the smallest, P2 and P3 are the larger, and P4 is the largest. In other words, the larger the difference ratio C between the brightness value B1 and the brightness value B2, the larger the first threshold value is set. The mixing ratio tables K1 to K4 in which the correspondence relationships F1(c) to F4(c) are defined in this way, are stored in the storage unit 2.

The mixing unit 21 refers to the mixing ratio table K corresponding to the input gradation value of the target pixel, and determines the mixing ratio W. Then, as in the above embodiment, the color correction unit 23 refers to the look-up tables L1 and L2 based on the determined mixing ratio W, and performs the gradation characteristic correction for the input gradation value.

With such a configuration, with respect to an input gradation value having a large absolute value of difference between the brightness value determined by the GSDF curve and the brightness value determined by the γ2.2 curve, it is possible to suppress the mixing ratio of color gradation characteristic when the saturation value is low. Then, for an input gradation value having a small difference, the mixing ratio can be increased even when the saturation value is low. As a result, it is possible to determine an appropriate mixing ratio according to the input gradation value.

Figure 10:
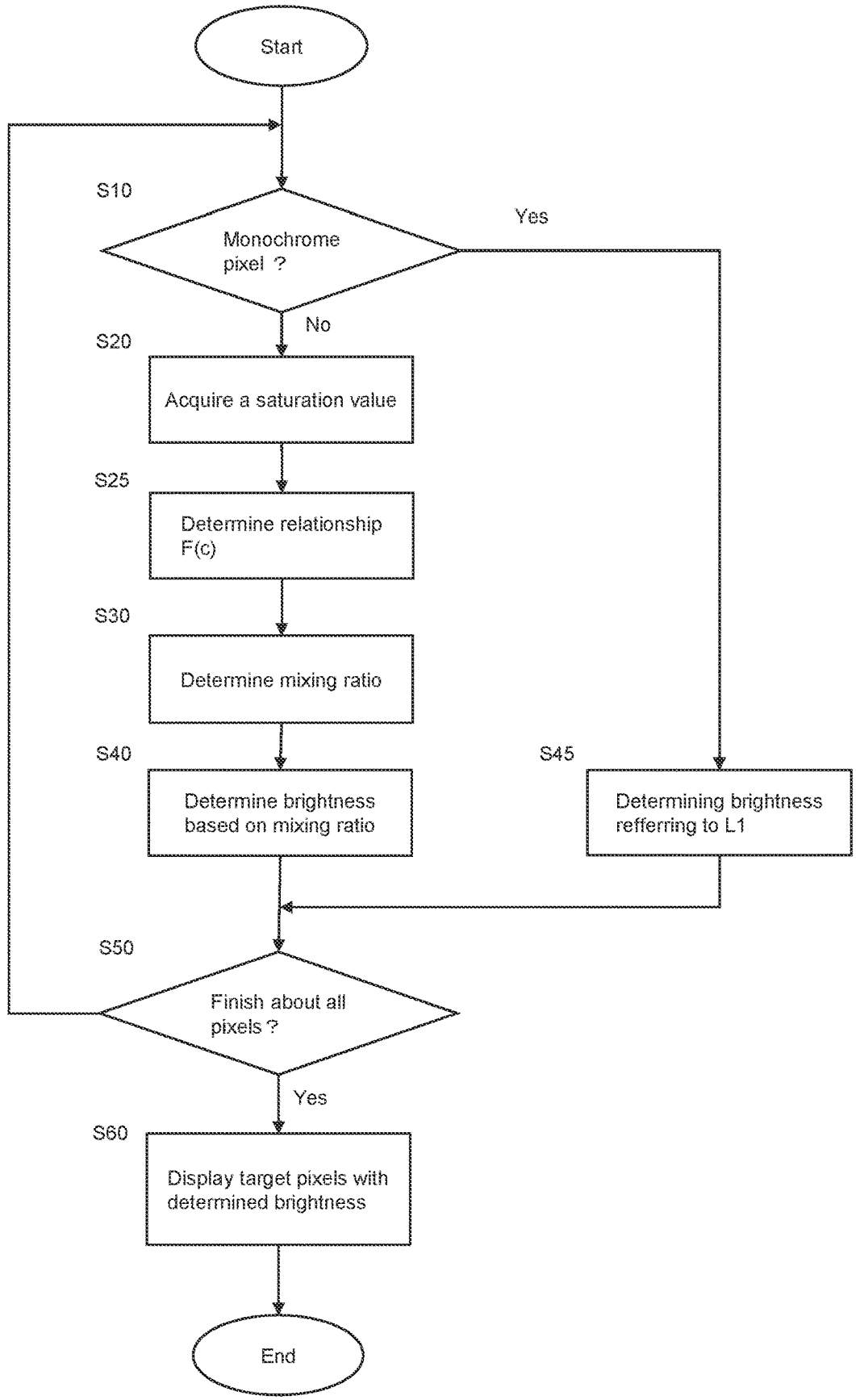
FIG. 10 is a process flow for explaining the procedure of the correction process according to the second embodiment.

The procedure of the correction process in the second embodiment will be described with reference to FIG. 10. The same process as in the first embodiment is designated by the same reference numerals, and the description thereof will not be repeated.

In step S25 after step S20, the correction unit 20 determines the relationship F(c) to be applied to the target pixel based on the input gradation value of the target pixel. After that, step S30 is performed, and the mixing ratio W for the target pixel is determined.

3. Other Embodiments

The application of the present invention is not limited to the above embodiment. For example, it can be applied to a so-called 3D-1D look-up table which refers to a common 1D look-up table for both color and monochrome after referring to a 3D look-up table which defines color gradation characteristic.

Further, a method of defining a 3D look-up table in which the brightness value as a result of mixing is defined, based on the brightness value satisfying the GSDF curve, the brightness value satisfying the γ2.2 curve, and the mixing ratio W corresponding to the saturation value c, may be adopted.

Further, a method of defining a 3D look-up table in which a brightness value realizing the combined gradation characteristic by mixing the color gradation characteristic and the monochrome gradation characteristic at the mixing ratio W corresponding to the saturation value c based on R, G, B in the input gradation value, may be adopted.

The brightness value may be determined by using an arithmetic expression instead of using a look-up table, in the way that the color gradation characteristic and the monochrome gradation characteristic are mixed at a mixing ratio W to obtain a synthesized gradation characteristic based on the saturation value c.

Further, in the above embodiment, the value of the monochrome look-up table L1 (brightness value) and the value of the color look-up table L2 (brightness value) are mixed for each pixel based on the mixing ratio W. Instead of this, by calculating the correction coefficient based on the mixing ratio W for the input gradation value of the input pixel (or by performing the same process in the lookup table), the brightness value realizing the gradation characteristic obtained by mixing the color gradation characteristic and the monochrome gradation characteristic at the mixing ratio W based on the saturation value c may be determined.

Further, in the above embodiment, with respect to the gradation characteristic correction of color pixels, an example of performing gradation characteristic correction to obtain a brightness value satisfying the γ2.2 curve is shown. However, the gamma value is not limited to the γ2.2 curve, and for example, a gamma value may be each value from 1.8 to 2.6. Further, a gradation characteristic having a brightness value satisfying Rec.709, PQ method (Perceptual Quantization), HLG method (Hybrid Log Gamma), or the like may be adopted.

Further, according to another aspect of the present invention, provided is a program for causing a computer to perform an image processing process comprising: acquiring a saturation value of a target pixel or a saturation value of a target small area including a target pixel and peripheral pixels around the target pixel, and correcting the target pixel so that a corrected gradation characteristic obtained by correcting the target pixel matches a gradation characteristic synthesized by mixing a color gradation characteristic and a monochrome gradation characteristic at a predetermined mixing ratio based on the saturation value, wherein assuming that the saturation value is c, and the mixing ratio of the color gradation characteristic is W, a value of W is represented by variable c as a relationship W=f(c) and satisfies the above condition.

Furthermore, the present invention can also be realized as a computer-readable non-temporary recording medium which stores the above-mentioned program.

Various embodiments according to the present invention have been described, these are presented as examples and are not intended to limit the scope of the invention. The novel embodiment can be implemented in various other forms, and various omissions, replacements, and changes can be made without departing from the gist of the invention. The embodiment and its modifications are included in the scope and gist of the invention, and are included in the scope of the invention described in the claims and the equivalent scope thereof.

1: Control unit
2: Storage unit
3: Operation unit
4: Display unit
5: Backlight
6: Communication unit
7: Bus
11: Determination unit
12: Saturation value acquisition unit
20: Correction unit
21: Mixing unit
22: Monochrome correction unit
23: Color correction unit
100: Image processing device
K: Mixing ratio table
L: Look-up table

The invention claimed is:

1. An image processing device comprising: a control unit configured to
   (i) receive input image data,
   (ii) acquire a saturation value of a target pixel or a saturation value of a target small area including a target pixel and peripheral pixels around the target pixel, the target pixel or the target small area being a pixel or an area in the received input image data, and
   (iii) correct the target pixel so that a corrected gradation characteristic obtained by correcting the target pixel matches a gradation characteristic synthesized by mixing a color gradation characteristic and a monochrome gradation characteristic at a predetermined mixing ratio W based on the saturation value, wherein
   the predetermined mixing ratio W follows or falls below a proportional relationship W=g(c) when the saturation value is below a threshold value (P), and
   the predetermined mixing ratio W follows a relationship W=f(c) when the saturation value is equal to or greater than the threshold value (P),
   wherein, for each saturation value c, f(c)>ag(c) with a>=1 is satisfied in a first range or a second range,
   the first range is a saturation value range from the threshold value (P) to a maximum value of the saturation value, the second range is a predetermined part of the saturation value range, and the predetermined part is equal to or greater than a predetermined percentage of the saturation value range.

2. The image processing device of claim 1, wherein the control unit is configured to determine the mixing ratio of a color gradation characteristic for color pixels and a monochrome gradation characteristic for monochrome pixels based on the acquired saturation value.

3. The image processing device of claim 1, wherein there is a second threshold value assuming that the threshold value (P) is set as a first threshold value,
   the second threshold value is equal to or higher than the first threshold value, and
   the gradient of the relationship f(c) decreases toward zero when the saturation value is equal to or higher than the second threshold value.

4. The image processing device of claim 1, wherein the relationship f(c) is at least a part of a sigmoid function.

5. The image processing device of claim 1, wherein the control unit is configured to determine the mixing ratio W and performs correction, using a relationship that the larger a difference between a brightness value in the color gradation characteristic of a target pixel and a brightness value in the monochrome gradation characteristic of the target pixel, the larger a threshold value (P) is set.

6. An image processing process comprising:
   receiving input image data,
   acquiring a saturation value of a target pixel or a saturation value of a target small area including a target pixel and peripheral pixels around the target pixel, the target pixel or the target small area being a pixel or an area in the received input image data, and
   correcting the target pixel so that a corrected gradation characteristic obtained by correcting the target pixel matches a gradation characteristic synthesized by mixing a color gradation characteristic and a monochrome gradation characteristic at a predetermined mixing ratio W based on the saturation value, wherein
   the predetermined mixing ratio W follows or falls below a proportional relationship W=g(c) when the saturation value is below a threshold value (P), and
   the predetermined mixing ratio W follows a relationship W=f(c) when the saturation value is equal to or greater than the threshold value (P), wherein, for each saturation value c, f(c)>ag(c) with o>=1 is satisfied in a first range or a second range,
   the first range is a saturation value range from the threshold value (P) to a maximum value of the saturation value,
   the second range is a predetermined part of the saturation value range, and the predetermined part is equal to or greater than a predetermined percentage of the saturation value range.

7. A non-transitory computer-readable storage medium storing a program for causing a computer to perform an image processing process comprising:
   receiving input image data,
   acquiring a saturation value of a target pixel or a saturation value of a target small area including a target pixel and peripheral pixels around the target pixel, the target pixel or the target small area being a pixel or an area in the received input image data, and
   correcting the target pixel so that a corrected gradation characteristic obtained by correcting the target pixel matches a gradation characteristic synthesized by mixing a color gradation characteristic and a monochrome gradation characteristic at a predetermined mixing ratio based on the saturation value, wherein
   the predetermined mixing ratio W follows or falls below a proportional relationship W=g(c) when the saturation value is below a threshold value (P), and
   the predetermined mixing ratio W follows a relationship W=f(c) when the saturation value is equal to or greater than the threshold value (P), wherein, for each saturation value c, f(c)>ag(c) with o>=1 is satisfied in a first range or a second range,
   the first range is a saturation value range from the threshold value (P) to a maximum value of the saturation value,
   the second range is a predetermined part of the saturation value range, and the predetermined part is equal to or greater than a predetermined percentage of the saturation value.

* * * * *